United States Patent
Kawada et al.

(10) Patent No.: US 9,493,132 B2
(45) Date of Patent: Nov. 15, 2016

(54) VEHICLE COMMUNICATION DEVICE

(71) Applicant: FUJI JUKOGYO KABUSHIKI KAISHA, Tokyo (JP)

(72) Inventors: Yuya Kawada, Tokyo (JP); Hiroshi Nomoto, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/598,121

(22) Filed: Jan. 15, 2015

(65) Prior Publication Data
US 2015/0217711 A1   Aug. 6, 2015

(30) Foreign Application Priority Data

Feb. 6, 2014   (JP) ................................. 2014-021539

(51) Int. Cl.
| | |
|---|---|
| B60R 21/00 | (2006.01) |
| G08B 25/01 | (2006.01) |
| G08G 1/00 | (2006.01) |
| G08B 25/00 | (2006.01) |

(52) U.S. Cl.
CPC ............ *B60R 21/00* (2013.01); *G08B 25/016* (2013.01); *G08G 1/205* (2013.01); *B60R 2021/0027* (2013.01); *G08B 25/004* (2013.01)

(58) Field of Classification Search
CPC .......... B60R 21/00; B60R 2021/0027; G08G 1/205; G08G 25/016; G08G 25/004
USPC ....................................................... 701/31.5
See application file for complete search history.

(56) References Cited

U.S. PATENT DOCUMENTS

| | | | |
|---|---|---|---|
| 2002/0037707 A1 | 3/2002 | Yoshioka et al. | |
| 2010/0164790 A1* | 7/2010 | Wisnewski | H01Q 1/3208 455/67.11 |

FOREIGN PATENT DOCUMENTS

| | | |
|---|---|---|
| JP | 11-177462 A | 7/1999 |
| JP | 2001-213269 A | 8/2001 |

(Continued)

OTHER PUBLICATIONS

Notification of Reasons for Refusal dated Feb. 23, 2016 issued in corresponding Japanese Application No. 2014-021539. (w/ English translation).

*Primary Examiner* — Anne M Antonucci
(74) *Attorney, Agent, or Firm* — McDermott Will & Emery LLP

(57) ABSTRACT

A communication system performs emergency communication for a vehicle in accordance with a communication scheme in which multiple antennas are used for receiving on the vehicle side data that is wirelessly transmitted through multiple channels of a same frequency band from a base station to the vehicle and one antenna on the vehicle is used for wireless data transmission from the vehicle to the base station. The vehicle is provided a first transmitting and receiving antenna that performs transmission and reception at normal times, and a second transmitting and receiving antenna that performs reception at normal times. The first transmitting and receiving antenna is disposed at the rear of the roof on the vehicle exterior, and the second transmitting and receiving antenna is disposed in the front position in the vehicle interior.

10 Claims, 5 Drawing Sheets

(56) References Cited

FOREIGN PATENT DOCUMENTS

| JP | 2002-117472 A | 2/2002 |
| JP | 2006-004180 A | 1/2006 |
| JP | 2007-137081 A | 6/2007 |
| JP | 2011-035652 A | 2/2011 |
| JP | 2011-049825 A | 3/2011 |
| JP | 2012-172334 A | 9/2012 |

* cited by examiner

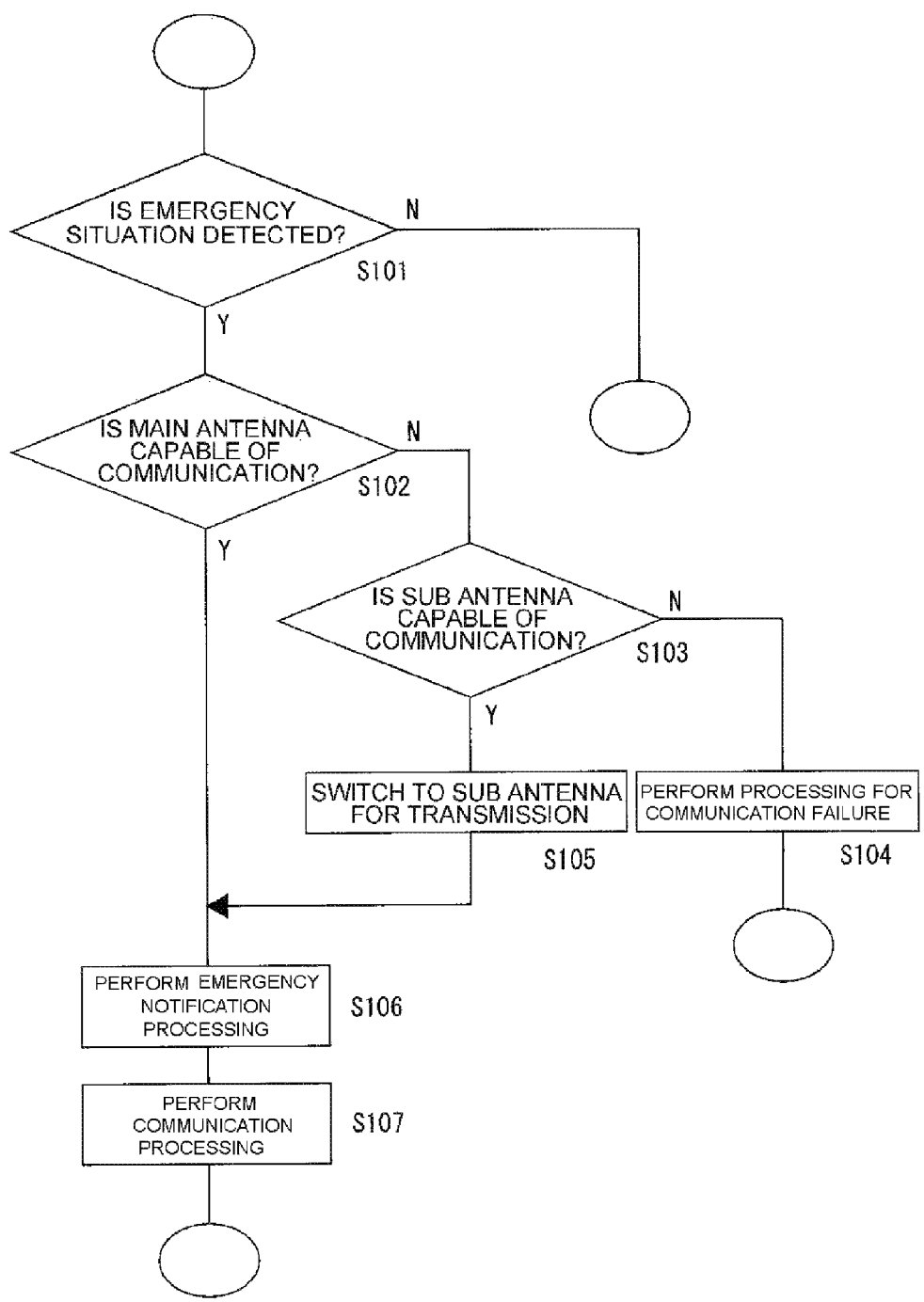

VEHICLE COMMUNICATION DEVICE

CROSS-REFERENCE TO RELATED APPLICATIONS

The present application claims priority from Japanese Patent Application No. 2014-021539 filed on Feb. 6, 2014, the entire contents of which are hereby incorporated by reference.

BACKGROUND

1. Technical Field

The present invention relates to a vehicle communication device for a vehicle such as an automobile and particularly relates to a communication device suitable for emergency communication.

2. Related Art

In recent years, there has been so-called telematics communication system in which a vehicle and an external system perform various communications via a base station.

The telematics communication system is expected to provide information relating to a vehicle, road traffic information, or the like to the vehicle and perform emergency communication.

Japanese Unexamined Patent Application Publication (JP-A) No. 2006-4180 discloses a communication system for a vehicle that performs communication with the outside of the vehicle through a wireless communication device provided to the vehicle.

JP-A No. 2012-172334 discloses a technique in which a vehicle is provided with a vehicle exterior antenna and a vehicle interior antenna as antennas for performing locking and unlocking of a door lock of the vehicle with a wireless electronic key.

While the telematics communication system described above allowing emergency communication in the case where a vehicle is involved in an accident such as a collision contributes greatly to ensuring human safety, aid, or the like, it is obvious that communication needs to be ensured at the time of emergency for that purpose.

However, in the case of a collision accident, an antenna or wiring for an antenna installed in a vehicle is highly likely to be damaged. Accordingly, a situation of a communication failure is easily conceivable.

There is a large limitation in terms of layout design, vehicle design, cost, and the like as to the number of antennas to be installed in a vehicle for backup in preparation for damage of an antenna.

SUMMARY OF THE INVENTION

Thus, an object of the present invention is to ensure communication at the time of emergency as much as possible with fewest possible antennas.

An aspect of the present invention provides a vehicle communication device including: a first transmitting and receiving antenna that is disposed in a rear position of a roof on an exterior of a vehicle and used for a communication scheme in which multiple antennas are used for receiving on the vehicle side data that is wirelessly transmitted through multiple channels of an identical frequency band from a base station to the vehicle and one antenna on the vehicle is used for wirelessly transmitting data from the vehicle to the base station, the first transmitting and receiving antenna being used for reception and transmission in the communication scheme in a normal state; a second transmitting and receiving antenna that is disposed in a front position in an interior of the vehicle for the communication scheme and used for reception in the communication scheme in a normal state; and a controller that performs execution control of transmission of emergency data using the second transmitting and receiving antenna in a case where an emergency state is detected and the first transmitting and receiving antenna is determined to be incapable of transmission.

The first transmitting and receiving antenna may be disposed in a position at a rear on the roof and approximately in a middle in a vehicle width direction.

The second transmitting and receiving antenna may be disposed in a space within a dashboard in the front position in the vehicle interior.

The controller may detect a collision of the vehicle as the emergency state.

BRIEF DESCRIPTION OF THE DRAWINGS

FIG. 4 is a flowchart of antenna switching processing of the example; and

DETAILED DESCRIPTION

Figure 1A:
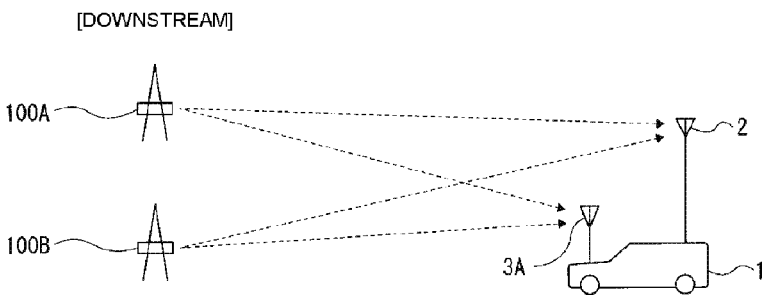
FIGS. 1A to 1C are illustrations of a communication scheme employed in an example of the present invention.

An example of the present invention will be described with reference to FIGS. 1A to 5B. In this example, a vehicle communication device compatible with a telematics communication system is mounted to a vehicle such as an automobile.

First, the outline and communication scheme of the telematics communication system assumed in this example will be described.

The telematics communication system of this example provides various services to an individual vehicle through communication between the individual vehicle (and occupant) and a service provider. For instance, the following services are assumed.

Emergency Communication

For instance, in the case where an emergency situation such as an airbag being activated due to a collision accident is recognized, information on the current position or the like is automatically transmitted, or a communication line is automatically opened to allow conversation between the occupant and a service operator, medical institution, police agency, or the like.

Roadside Service

In the case of a vehicle breakdown or insufficient gasoline, current position information of a vehicle is transmitted, or communication is performed to report the situation through voice communication or the like.

Regarding Vehicle

Maintenance such as oil replacement, periodic inspection is advised to the occupant, or a prompt for a failure diagnosis is given.

Regarding Measures Against Theft and Security

In the case where a vehicle is stolen, position information of the vehicle is acquired through communication on the service provider and notified to an owner of the vehicle, or the situation of the vehicle is monitored through data communication to transmit an alarm to a mobile device of the owner of upon any abnormal situation.

The above are merely examples of a service that can be realized with the telematics communication system, and other various services are conceivable. Use of the telematics communication system is expected to provide every driver with a safe and secure driving environment and convenience at the time of driving. The technique of this example is designed particularly to ensure emergency communication.

In the telematics communication system of this example, the communication scheme is such that the vehicle uses a plurality of antennas receive data wirelessly transmitted through a plurality of channels of a same frequency band from a base station, while the vehicle uses one antenna to wirelessly transmitted to the base station. Such communication scheme includes, for example, a multiple-input and multiple-output (MIMO) scheme compatible with 3G and 3.9G (where "G" stands for Generation) long term evolution (LTE) standard. It is well known that the MIMO scheme is a technique of transmitting and receiving data simultaneously through a plurality of routes (channels) of a same frequency band using a plurality of antennas. By increasing the number of antennas, it is possible to increase the speed of communication. However, increasing the number of antennas increases channels and increases the electric power load on a terminal at the time of transmission or reception.

In the telematics communication system of this example, the vehicle uses two antennas.

FIG. 1A illustrates base station antennas 100A and 100B and a vehicle 1. Communication between a service provider (not illustrated) and the vehicle 1 is performed via base stations built in various locations.

The vehicle 1 needs a transmitting and receiving antenna 2 and a receiving antenna 3A as minimal antenna configuration.

FIG. 1A illustrates downstream traffic (from the base stations to the vehicle). Specifically, wireless data transmission is performed in two channels from the two base station antennas 100A and 100B. The vehicle 1 receives data using the two antennas (the transmitting and receiving antenna 2 and the receiving antenna 3A).

Figure 1B:
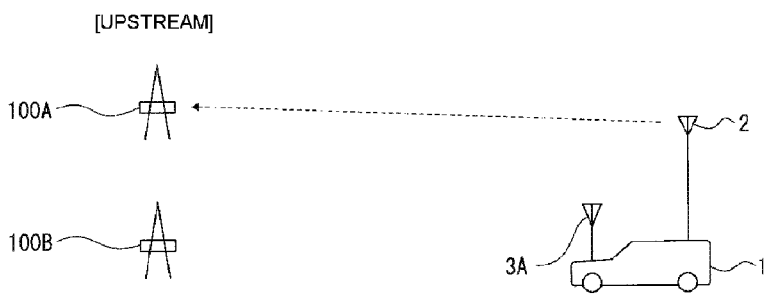

FIG. 1B illustrates upstream traffic (from the vehicle to the base stations). Specifically, the vehicle 1 uses the transmitting and receiving antenna 2 to perform wireless data communication in one channel. Since only one channel is used for transmission from the vehicle 1, the vehicle 1 needs to have only one transmitting and receiving antenna 2 for transmission.

Thus, the minimal antenna configuration for the vehicle 1 includes the two antennas, i.e., the transmitting and receiving antenna 2 and the receiving antenna 3A.

However, such a configuration cannot transmit data when a communication failure occurs in the transmitting and receiving antenna 2. Therefore, in this example the vehicle 1 is provided with a transmitting and receiving antenna 3 instead of the receiving antenna 3A, and thus uses the two transmitting and receiving antennas 2 and 3.

Figure 1C:
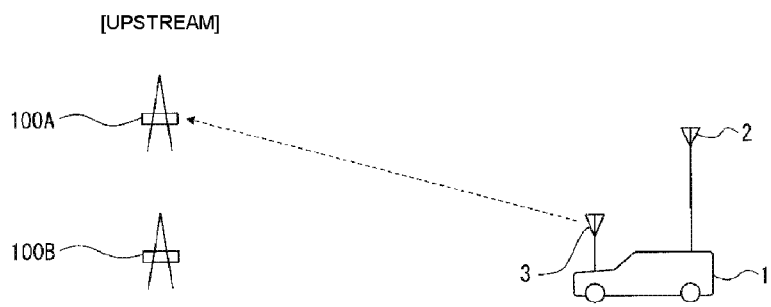

Accordingly, wireless data transmission to the base station from the vehicle 1 can be performed using the transmitting and receiving antenna 3, as illustrated in FIG. 1C, in addition to the wireless data communication in illustrated FIGS. 1A and 1B.

Figure 2:
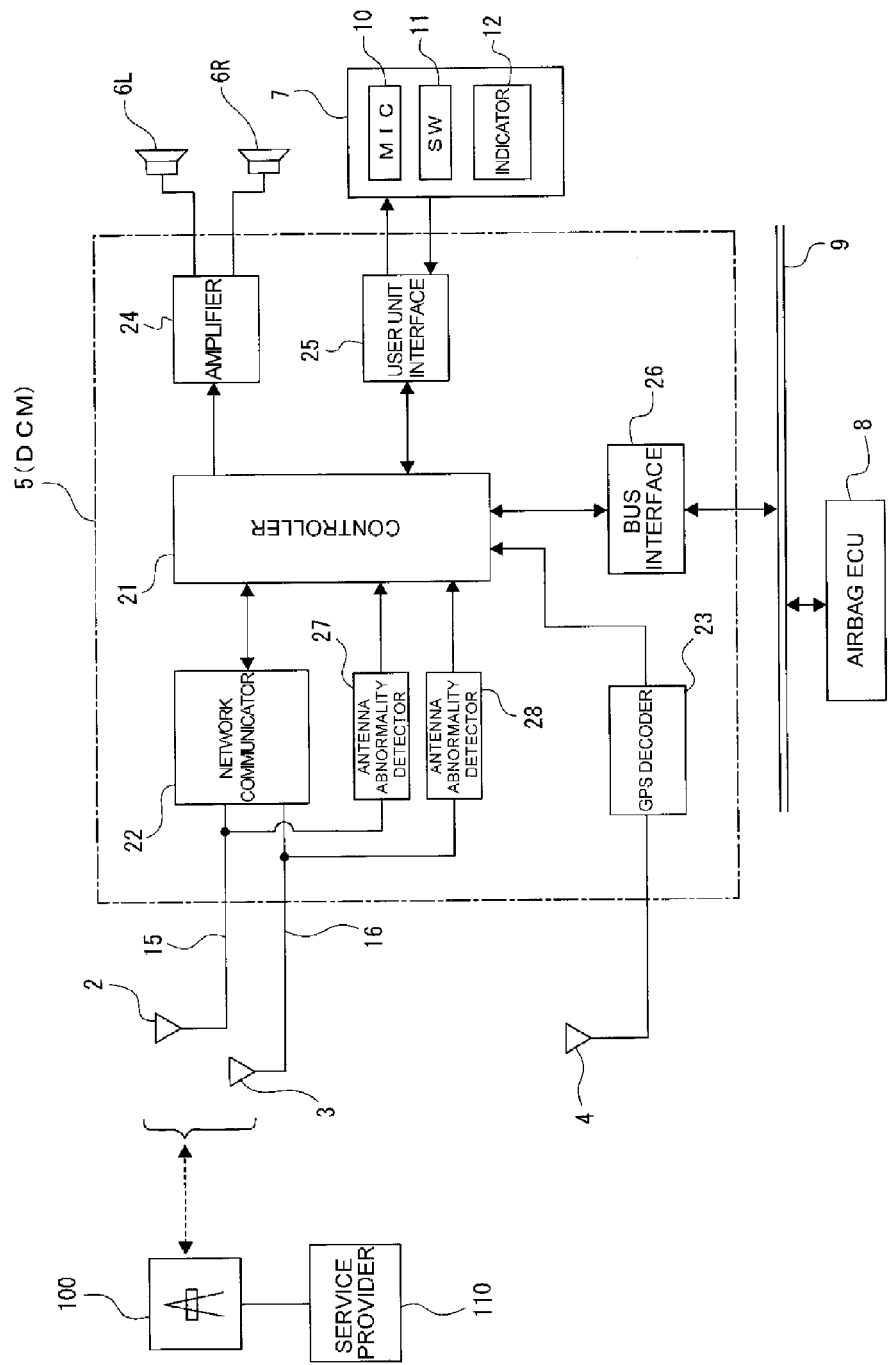
FIG. 2 is a block diagram of a vehicle communication device of the example.

FIG. 2 illustrates a configuration example of the vehicle communication device of this example. The vehicle communication device is configured as a vehicle-side communication terminal system of the telematics communication system capable of communication with a service provider 110 via a base station 100.

The vehicle communication device of this example includes the transmitting and receiving antenna 2 (hereinafter referred to as "main antenna 2"), the transmitting and receiving antenna 3 (hereinafter referred to as "sub antenna 3"), a global positioning system (GPS) antenna 4, a data communication module (DCM) 5, speakers 6L and 6R, and a user console 7.

The main antenna 2 and the sub antenna 3 are used for wireless data communication based on the MIMO scheme illustrated in FIGS. 1A to 1C. At normal times (other than in an emergency such as a collision accident), the main antenna 2 is used for transmission and reception, and the sub antenna 3 is used for reception.

The GPS antenna 4 receives a radio signal from a GPS satellite to obtain position information (latitude and longitude), speed information and the like.

The speakers 6L and 6R are used to output, to the occupant of the vehicle 1, a voice message and voice speech delivered via the telematics communication system. The speakers 6L and 6R may be installed within the vehicle as dedicated speakers for the vehicle communication device. Alternatively, a speaker used in a car audio system may be utilized as the speakers 6L and 6R. Although the left and right speakers 6L and 6R achieves two channels for the left and right in this example, the vehicle needs to have only at least one speaker for a voice output of the vehicle communication device.

The user console 7 is a user interface of the vehicle communication device. For instance, the user console 7 is an overhead type console and provided in an upper portion in the vehicle interior.

The user console 7 is provided with a microphone 10, a manual communication switch 11, an indicator 12, and the like.

The microphone 10 collects a voice of the occupant upon a speech at the time of emergency to be delivered via the telematics communication system.

The manual communication switch 11 is a switch operated by the occupant in the case where the occupant wants to communicate/converse the service provider 110 via the telematics communication system for emergency contact, roadside service or assistance, or the like.

The indicator 12 displays information to be notified to the occupant in the operation of the telematics communication system, such as the communication state, warning message, or vehicle state.

The DCM 5 is a communication unit that realizes the operation of the telematics communication and functionally includes a controller 21, a network communicator 22, a GPS decoder 23, an amplifier 24, a user unit interface 25, a bus interface 26, and antenna abnormality detectors 27 and 28.

The controller 21 controls these components of the DCM 5 and executes a necessary communication operation or the like.

The network communicator 22 performs processing for data communication via the telematics communication system using the main antenna 2 and the sub antenna 3. For instance, the network communicator 22 performs encoding, modulation, high-frequency amplification, or the like of transmission data that is transferred from the controller 21 to generate a transmission signal, and supplies the signal normally to the main antenna 2 so that transmission is executed. The network communicator 22 performs detection and demodulation of a reception signal from the main antenna 2 and the sub antenna 3, binarization, decoding of reception data, and the like and passes the reception data to the controller 21. The network communicator 22 can also perform switching of the antennas at the time of transmission, in accordance with a command from the controller 21. Specifically, the network communicator 22 switches between the main antenna 2 and the sub antenna 3 as an antenna used for data transmission. That is the transmission signal can be supplied selectively to either one of the main antenna 2 and the sub antenna 3.

The GPS decoder 23 performs decoding of a signal received by the GPS antenna 4, obtains information such as current position information and speed information, and passes the information to the controller 21.

The amplifier 24 performs processing for outputting, from the speakers 6L and 6R, voice data, such as voice message and voice speech, supplied from the controller 21. For instance, The amplifier 24 performs digital-analog conversion (D/A conversion) processing, level adjustment and gain control processing, power amplification processing, or the like for voice data, and supplies to a voice signal to the speakers 6L and 6R.

The user unit interface 25 performs input and output between the user console 7 and the controller 21. For instance, the user unit interface 25 performs analog-digital conversion (A/D conversion), necessary codec processing, and the like for a voice signal collected by the microphone 10, and passes transmission voice passed to the controller 21. If the switch 11 is operated, the user unit interface 25 inputs and notifies an operation information signal to the controller 21. In addition, the user unit interface 25 transfers a display control signal for the indicator 12 from the controller 21 to the user console 7.

The bus interface 26 is an interface for a bus 9 within the vehicle. The vehicle 1 is provides with various control units including a microcomputer such as an engine electronic control unit (ECU) and a display ECU. The DCM 5 is capable of communicating with the control units via the bus 9. In FIG. 2, an airbag ECU 8 is illustrated. The DCM 5 can obtain collision detection information from the airbag ECU 8.

The antenna abnormality detectors 27 and 28 perform detection of disconnection and/or failure of the main antenna 2 and the sub antenna 3 respectively. For instance, the antenna abnormality detectors 27 detects disconnection or ground fault based on the terminal voltage of an antenna line 15, and detects whether or not the main antenna 2 is capable of communication through examination on a reception electric field intensity signal or the like. Similarly, the antenna abnormality detectors 28 detects disconnection or ground fault based on the terminal voltage of an antenna line 16, and detects whether or not the sub antenna 3 is capable of communication through examination on a reception electric field intensity signal or the like. An abnormality determination signal based on the detection is notified to the controller 21.

Figure 3A:
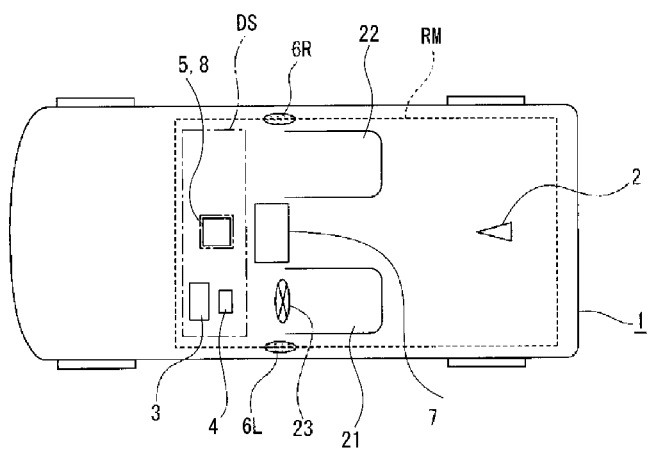
FIGS. 3A and 3B illustrate a layout of an antenna and components according to the example.
Figure 3B:
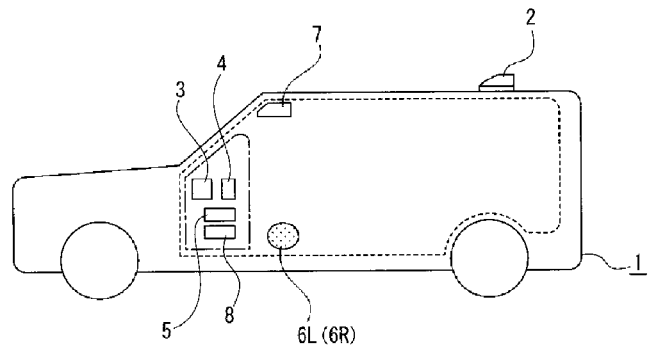

The layout of each component of the vehicle communication device configured in this manner in the vehicle 1 will be described with FIGS. 3A and 3B. FIGS. 3A and 3B schematically illustrate the positions in which the respective components are disposed when the vehicle 1 is seen from above and the positions in which the respective components are disposed when the vehicle 1 is seen from a side, respectively.

A space encompassed with a broken line is a vehicle interior space RM. A space encompassed in a dashed-dotted line is a dashboard space DS. The dashboard space DS refers to the inside of a dashboard in front of a driver's seat 18 and a passenger seat 17 in the vehicle interior space RM. In other words, the dashboard space DS is a space on the far side of an instrument panel opposing an occupant in the driver's seat 18 and the passenger seat 17.

In this example, the vehicle 1 is a left-hand drive vehicle in which the driver's seat 18 with an illustrated steering wheel 19 is on the left side.

The main antenna 2 is disposed on a roof of the vehicle 1 outside the vehicle interior space RM and in the rear position in the vehicle 1. The position of the disposed main antenna 2 is approximately in the middle in the vehicle width direction.

The sub antenna 3 is disposed in the dashboard space DS in the front in the vehicle interior space RM. More specifically, the position in the dashboard space DS is in the front of the driver's seat 18.

The GPS antenna 4 is disposed in a position in the dashboard space DS that is in the front of the driver's seat 18, as the sub antenna 3.

The GPS antenna 4 is disposed in a position to be aligned with the sub antenna 3 in the front-back direction when seen from the driver's seat. The GPS antenna 4 is disposed on the driver's seat 18 side, and the sub antenna 3 on the far side when seen from the driver's seat 18.

The DCM 5 is disposed approximately in the middle position in the vehicle width direction in the dashboard space DS. For instance, in the case where a car audio device or navigation device is attached, the DCM is disposed beyond such device.

The airbag ECU 8 is disposed in a position within the dashboard space DS and immediately below the DCM 5.

The user console 7 is attached as an overhead console in a position above the driver's seat 18 and the passenger seat 17. For instance, the position is where an occupant in the driver's seat 18 or the passenger seat 17 can look up and check the indicator 12 or the switch 11. The position is also where the microphone 10 can easily collect the voice of an occupant.

The speakers 6L and 6R are disposed within left and right doors, for instance.

The vehicle communication device of this example is equipped within the vehicle 1 with the configuration and disposition in FIGS. 2 and 3 described above. The vehicle communication device performs communication with the MIMO scheme compatible with LTE using the main antenna 2 and the sub antenna 3 as described with FIG. 1.

At normal times, as mentioned earlier, the main antenna 2 is used for transmission and reception, and the sub antenna 3 is used for reception.

In this example, the control function of the controller 21 allows the DCM 5 to switch an antenna used for transmission at the time of an emergency.

FIG. 4 illustrates an example of processing of the controller 21 in the case where an emergency situation is detected.

The controller 21 can receive information from each control unit within the vehicle via the bus interface 26 and, in particular, constantly monitors collision detection information from the airbag ECU 8 with step S101.

Obviously, the controller 21 may be configured to recognize a collision, overturn, vehicle body posture abnormality, or the like not only from information from the airbag ECU 8 but also by mounting an impact sensor, posture sensor, or the like inside or outside the DCM 5.

In the case where the controller 21 has detected an emergency situation, e.g., damage in the vehicle body, from the collision detection information from the airbag ECU 8 or the like, the controller 21 proceeds to step S102 from step S101 to check for an abnormality determination signal of the antenna abnormality detector 27 and determine whether or not the main antenna 2 is in a state where communication is possible.

If the main antenna 2 is capable of communication, the controller 21 proceeds to step S106 to perform emergency notification processing. That is, in accordance with the determination that an emergency situation such as an accident has occurred, emergency data transmission is automatically performed. For instance, the controller 21 generates emergency notification data including a vehicle ID (information with which the vehicle or registered owner can be identified) or newest position information obtained from the GPS decoder 23, passes the data to the network communicator 22 and causes the network communicator 22 to transmit the data. If more detailed information, e.g., damaged part or degree of damage, can be detected, such information may be included. For instance, in the case where a camera is mounted to capture the vehicle interior space RM and/or the outside of the vehicle, an image captured by the camera such as the behavior of an occupant in the vehicle interior and of the situation outside the vehicle may be included in the emergency notification data.

Next, in step S107, the controller 21 performs communication processing. That is, even if the occupant does not operate the switch 11, the network communicator 22 is automatically caused to execute calling processing of a communication line to open a voice communication line between the occupant and an operator of the service provider 110, for instance. Data of the voice speech of the operator or the like is delivered to the occupant by the speakers 6L and 6R, and the voice of the occupant collected by the microphone 10 is transmitted as transmission voice.

For the transmission in steps S106 and S107 described above, the main antenna 2 is used if the main antenna 2 is functioning normally, since antenna switching is not particularly performed.

In the case where the main antenna 2 is determined in step S102 to be in a state of a communication failure, the controller 21 proceeds to step S103 to check for an abnormality determination signal of the antenna abnormality detector 28 and determine whether or not the sub antenna 3 is in a state where communication is possible.

If both of the main antenna 2 and the sub antenna 3 are incapable of communication, emergency communication cannot be performed. Therefore, error processing for a communication failure is performed in step S104.

If the sub antenna 3 is capable of communication, the controller 21 proceeds to step S105 to command the network communicator 22 to switch the antenna used for transmission to the sub antenna 3.

The controller 21 then performs the emergency notification processing and the communication processing described above in steps S106 and S107. In this case, the sub antenna 3 is used for transmission and reception in steps S106 and S107.

The vehicle communication device of this example attains the following effects.

The vehicle communication device of this example performs communication with a communication scheme in which multiple antennas are used for receiving on the vehicle side data wirelessly transmitted through multiple channels of a same frequency band from a base station to the vehicle, and one antenna on the vehicle is used for wirelessly transmitting data transmission from the vehicle to the base station. In this case, the main antenna 2 (serving as the first transmitting and receiving antenna of the present invention) disposed in the rear position of the roof on the vehicle exterior for use in reception and transmission in the normal state and the sub antenna 3 (serving as the second transmitting and receiving antenna of the present invention) disposed in the front position in the vehicle interior for use in reception in the normal state are provided. The DCM 5 (controller 21) is provided to perform execution control of transmission of emergency data using the sub antenna 3, in the case where an emergency state is detected and the main antenna 2 is determined to be incapable of transmission.

In this case, the main antenna 2 used for transmission at normal times is disposed on the roof on the vehicle exterior, which is suitable as a position in which an antenna is disposed, taking into consideration a radio environment for wireless data communication. Thus, preferential use of the main antenna 2 for transmission is suitable for communication at normal times.

Here, a case of an accident such as a collision will be described. At the time of the collision, the main antenna 2 on the roof is more likely to become incapable of communication than the sub antenna 3. For instance, in the case of a rear-end collision as in FIG. 5A, the main antenna 2 disposed in the rear position is highly likely to become damaged. Further, the main antenna 2 is also highly likely to become damaged in the case of an overturn of the vehicle body.

Figure 5A:
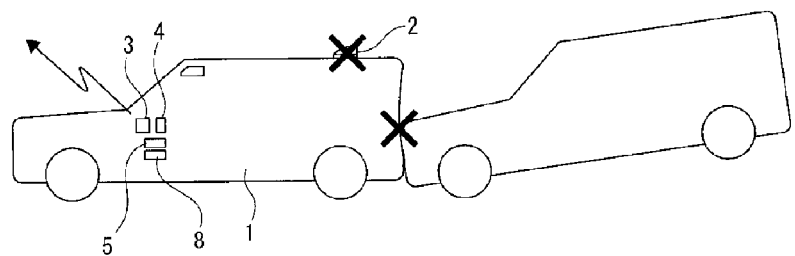
FIGS. 5A and 5B each illustrate a situation at the time of a collision according to the example.
Figure 5B:
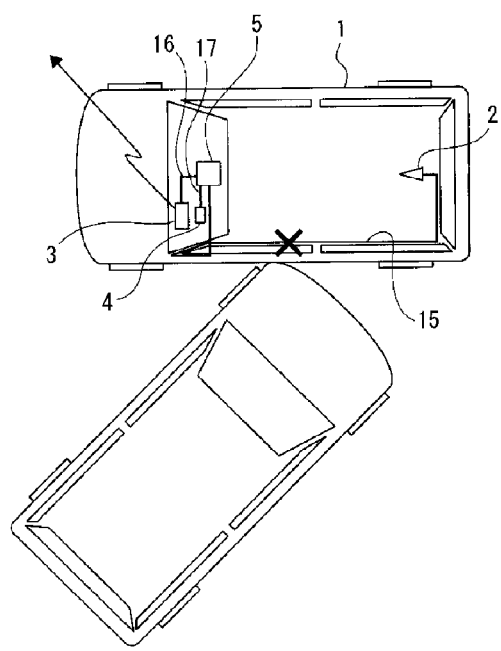

As illustrated in FIG. 5B, the antenna line 15 between the main antenna 2 and the DCM 5 is disposed in the rear in a route that extends to the left door side, for instance, from the DCM 5 in the dashboard space DS and then runs along the bottom, side, and top of a left window. Thus, in the case of a side collision as in FIG. 5B, there is a high possibility of disconnection or ground fault in the antenna line 15 that renders the main antenna 2 incapable of communication.

On the other hand, the sub antenna 3 is disposed in the front within the vehicle 1, and thus the sub antenna 3 is very unlikely to be damaged in a rear-end collision.

Further, since the sub antenna 3 is disposed in the vehicle interior space RM, the sub antenna 3 is unlikely to be damaged even if there is an overturn of the vehicle body or the like.

Further, due to the sub antenna 3 being disposed in the dashboard space DS, the dashboard serves a protective function to, whereby the sub antenna 3 is further unlikely to become damaged. Since the position of the sub antenna 3 is where an occupant cannot touch the sub antenna 3, the sub antenna 3 is unlikely to become damaged due to human action.

The antenna line 16 between the sub antenna 3 and the DCM 5 is arranged only within the dashboard space DS, and the distance at which the line is arranged is short. Therefore, the possibility of disconnection or ground fault is unlikely to occur in the sub antenna 3.

In the case where the DCM 5 is damaged, emergency communication cannot be executed in the first place, regardless of the state of the main antenna 2 and the sub antenna 3. Therefore, in this example, the DCM 5 is disposed in approximately the middle position in the width direction within the dashboard space DS in the front in the vehicle interior, i.e., a position that is most protected at the time of a collision from the front, rear, left, or right, or at the time of an overturn. Thus, the DCM 5 is similarly or more likely to be damaged than the sub antenna 3.

Depending on the type of vehicle, the possibility of protection with respect to a front-end collision can be increased by disposing the sub antenna 3, the antenna line 16, and the DCM 5 in the dashboard space DS. This is because vehicle structures employed, particularly in recent years, are such that the vehicle interior space RM is maintained as much as possible even if a part such as a bumper, hood, or fender is crushed in the case of a front-end collision.

Accordingly, in the case of a collision accident, the the main antenna 2 is highly likely become incapable of communication, while an abnormality is sufficiently unlikely to occur in the sub antenna 3 and the DCM 5.

Thus, in this example, a transmitting and receiving antenna capable of transmission is used for the sub antenna 3. In the case where the main antenna 2 has become incapable of communication, as can be seen with the processing in FIG. 4, the antenna used for transmission is switched to the sub antenna 3 to perform emergency transmission in steps S106 and S107. Accordingly, transmission at the time of emergency is ensured as much as possible.

Obviously, there is a possibility of damage or failure of the sub antenna 3 due to a front-end collision. However, the DCM 5 is in approximately the middle position in the vehicle width direction within the dashboard space DS where the protective function is highest within the vehicle interior space RM. In the case of a front-end collision of the vehicle, the possibility that the main antenna 2 functions effectively is high. That is, the DCM 5 and the main antenna 2 are likely to remain normal, whereby emergency communication is highly likely to be possible.

The main antenna 2 is disposed on the roof, but in a position in the rear of the roof and approximately in the middle in the vehicle width direction. Thus, the possibility of damage can be reduced as much as possible. That is, the position in the rear of the vehicle and approximately in the middle in the width direction is a position that is less likely to be affected by a front-end collision or a side collision.

That is, in this example, the main antenna 2 and the sub antenna 3 are disposed separately at the rear on the vehicle exterior and at the front in the vehicle interior to reduce the risk of both being damaged upon a vehicle accident, and switching between the two antennas 2 and 3 is performed at the time of emergency to allow transmission. As a result, the possibility of ensuring a communication environment at the time of emergency can be increased. Accordingly, the telematics communication system can effectively enable activity for human safety, protection, aid, or the like.

Since the main antenna 2 is used for transmission as much as possible, opportunities for performing transmission on the roof where the transmission environment is relatively favorable can be increased.

In the processing in FIG. 4, the controller 21 performs the processing of switching the antenna according to necessity (steps S102 to S105) and the processing of emergency communication (steps S106 and S107), in the case where a collision of the vehicle is detected as an emergency state with, for instance, the collision detection information from the airbag ECU 8. A situation where emergency notification for aid or the like of an occupant is necessary and an antenna failure has occurred is considered to be a collision. Therefore, determining such a case in step S101 and performing the processing in steps S102 and thereafter is most efficient and appropriate.

The example has been described above. However, the present invention is not limited to this example, and various modified examples are conceivable.

As illustrated in FIG. 5B, in the above example, the positions of the antenna line 15 for the main antenna 2 and the sub antenna 3 are both on the left side in the width direction of the vehicle. However, the antenna line 15 may be on the right window side, i.e., on the opposite side of the sub antenna 3 when seen from the middle of the vehicle width. Accordingly, regarding a collision from the left or right side, the two antennas 2 and 3 are further unlikely to become incapable of communication simultaneously.

The above example uses two antennas, i.e., the main antenna 2 and the sub antenna 3, for telematics communication. Alternatively, three or more antennas may be mounted.

Note that the use of two transmitting and receiving antennas as in the example described above is very preferred because the possibility of a communicable state being maintained can be increased with the same number of antennas (two, i.e., the transmitting and receiving antenna and the receiving antenna) as that minimally required in the MIMO scheme. In particular, the use of two transmitting and receiving antennas allows easier designing of a vehicle interior system compared to a case where more antennas are used, and avoids a decrease in freedom of design or an increase in cost due to a large number of antennas.

In the above example, the main antenna 2 is disposed on the roof and approximately in the middle position in the vehicle width direction. Alternatively, the main antenna 2 may be disposed at a position be displaced toward the left side or the right side in the vehicle width direction.

The sub antenna 3 may be disposed in the vehicle interior space RM that is not necessarily the dashboard space DS.

The communication scheme is not limited to the MIMO scheme compatible with 3G or 3.9G and may be another communication scheme in which multiple antennas are used for downstream traffic and one antenna is used for upstream traffic.

The invention claimed is:

1. A vehicle communication device that uses a communication scheme in which multiple antennas are used for receiving on the vehicle side data that is wirelessly transmitted through multiple channels of an identical frequency band from a base station to the vehicle and one antenna on the vehicle is used for wirelessly transmitting data from the vehicle to the base station, the vehicle communication device comprising:
    a first transmitting and receiving antenna that is disposed in a rear position of a roof on an exterior of a vehicle, and is used for reception and transmission in the communication scheme in a normal state;
    a second transmitting and receiving antenna that is disposed in a front position in an interior of the vehicle for the communication scheme and used for reception in the communication scheme in a normal state; and
    a controller that performs execution control of transmission of emergency data using the second transmitting and receiving antenna in a case where an emergency state is detected, based on information other than the state of the first transmitting and receiving antenna, and the first transmitting and receiving antenna is determined to be incapable of transmission.

2. The vehicle communication device according to claim 1, wherein the first transmitting and receiving antenna is disposed in a position at a rear on the roof and approximately in a middle in a vehicle width direction.

3. The vehicle communication device according to claim 2, wherein the second transmitting and receiving antenna is disposed in a space within a dashboard in the front position in the vehicle interior.

4. The vehicle communication device according to claim 3, wherein the controller detects a collision of the vehicle as the emergency state.

5. The vehicle communication device according to claim 2, wherein the controller detects a collision of the vehicle as the emergency state.

6. The vehicle communication device according to claim 1, wherein the second transmitting and receiving antenna is disposed in a space within a dashboard in the front position in the vehicle interior.

7. The vehicle communication device according to claim 6, wherein the controller detects a collision of the vehicle as the emergency state.

8. The vehicle communication device according to claim 6, wherein the controller is disposed in a space within a dashboard in the front position in the vehicle interior and is coupled with the second transmitting and receiving antenna.

9. The vehicle communication device according to claim 1, wherein the controller detects a collision of the vehicle as the emergency state.

10. The vehicle communication device according to claim 1, wherein the controller is disposed in the front position in the interior of the vehicle and is coupled with the second transmitting and receiving antenna.

* * * * *